(12) United States Patent
Zhou et al.

(10) Patent No.: US 12,355,938 B2
(45) Date of Patent: Jul. 8, 2025

(54) MULTI-VIEW VIRTUAL DISPLAY SIGNAL PROCESSING METHOD AND SYSTEM, COMPUTER READABLE STORAGE MEDIUM, AND ELECTRONIC DEVICE

(71) Applicant: SHANGHAI GRAPHIC DIGITAL INFORMATION CO., LTD., Shanghai (CN)

(72) Inventors: Qinghui Zhou, Shanghai (CN); Daili Tang, Shanghai (CN); Chunjian Lu, Shanghai (CN)

(73) Assignee: SHANGHAI GRAPHIC DIGITAL INFORMATION CO., LTD., Shanghai (CN)

( * ) Notice: Subject to any disclaimer, the term of this patent is extended or adjusted under 35 U.S.C. 154(b) by 79 days.

(21) Appl. No.: 18/269,954

(22) PCT Filed: Jan. 18, 2022

(86) PCT No.: PCT/CN2022/072511
§ 371 (c)(1),
(2) Date: Jun. 28, 2023

(87) PCT Pub. No.: WO2022/156671
PCT Pub. Date: Jul. 28, 2022

(65) Prior Publication Data
US 2023/0396758 A1    Dec. 7, 2023

(30) Foreign Application Priority Data
Jan. 22, 2021  (CN) .......................... 202110090248.1

(51) Int. Cl.
*H04N 13/398*    (2018.01)
*H04N 13/167*    (2018.01)
*H04N 13/344*    (2018.01)

(52) U.S. Cl.
CPC ......... *H04N 13/398* (2018.05); *H04N 13/167* (2018.05); *H04N 13/344* (2018.05)

(58) Field of Classification Search
CPC .. H04N 13/167; H04N 13/344; H04N 13/398; H04N 13/282; H04N 13/332; H04N 13/341; H04N 13/354; H04N 2213/008
(Continued)

(56) References Cited

U.S. PATENT DOCUMENTS

2007/0153122 A1* 7/2007 Ayite .................. H04N 13/354
                                                              348/55
2010/0007582 A1  1/2010 Zalewski
(Continued)

FOREIGN PATENT DOCUMENTS

| CN | 102740015 A | 10/2012 |
| CN | 211606691 U | * 9/2020 ............... G09G 3/32 |
| CN | 212909830 U | 4/2021 |

OTHER PUBLICATIONS

International Search Report of PCT Patent Application No. PCT/CN2022/072511 issued on Mar. 16, 2022.

*Primary Examiner* — Behrooz M Senfi (57) ABSTRACT

The present disclosure relates to a multi-view virtual display signal processing method and system, a computer readable storage medium, and an electronic device. The multi-view virtual display signal processing method comprises: in a state that at least two view signals of a predetermined frequency are received, synchronously processing the at least two view signals to form a multi-view video signal and a multi-channel audio signal, and outputting the two signals (S110); and forming, according to the multi-view video signal, a first-type control signal matching the multi-view video signal and outputting the first-type control signal (S120).

15 Claims, 5 Drawing Sheets

(58) Field of Classification Search
USPC .......................................................... 348/53
See application file for complete search history.

(56) References Cited

U.S. PATENT DOCUMENTS

| | | | | |
|---|---|---|---|---|
| 2012/0243689 A1* | 9/2012 | Jeong | ................. | G06T 7/254 |
| | | | | 381/17 |
| 2013/0169755 A1* | 7/2013 | Choo | ................. | H04N 13/341 |
| | | | | 348/46 |
| 2015/0035957 A1 | 2/2015 | Sheu | | |

* cited by examiner

MULTI-VIEW VIRTUAL DISPLAY SIGNAL PROCESSING METHOD AND SYSTEM, COMPUTER READABLE STORAGE MEDIUM, AND ELECTRONIC DEVICE

The present application claims the priority to Chinese Patent Application No. CN202110090248.1, filed to the Chinese Patent Office on Jan. 22, 2021, which is incorporated in its entirety herein by reference.

TECHNICAL FIELD

The present invention relates to a multi-view virtual display signal processing method and system, a computer readable storage medium, and an electronic device.

BACKGROUND ART

With the development of computer technology, and the improvement of image processing technology and big data processing capabilities, wearable virtual reality devices have been favored by more and more users. At the same time, with the rapid development of intelligent terminals and the Internet of Things technology, more and more intelligent devices, especially smart terminal devices with display screens, such as computers, smart phones, smart TVs, etc., are used. Virtual reality (VR) experience has the characteristics of 3I, namely immersion, interaction and imagination, which reflect the main advantages of VR. Among them, immersion is most relevant to the display system. The primary criterion for judging whether a display device can be used for VR is whether it is capable to provide a sufficiently immersive viewing experience for the experiencer.

With the development of VR technology and the improvement of equipment performance, VR is currently widely used in education and teaching, industrial design, military, emergency and many other fields to improve work efficiency of various industries. According to the characteristics of VR application, VR display devices can be simply divided into VR head-mounted displays used by single persons, and medium and large stereoscopic display systems that enable simultaneous watching by multiple people. VR head-mounted displays make good immersive experience possible, but have the shortcoming of isolating natural communication. In other words, the experiencer and others have to communicate with low efficiency in a virtual environment through VR technology, and there exist obvious communication barriers. In contrast, the above medium and large stereoscopic display systems, through the existing stereoscopic display technology and in combination with other VR technologies, are capable to provide one experiencer with a stereoscopic viewing angle and an immersive experience, but cannot fully meet the demand of more viewers, thereby resulting in that other viewers have a bad immersive experience.

SUMMARY

Based on the defects of the prior art, the present invention provides a multi-view virtual display signal processing method and system, a computer readable storage medium, and an electronic device, specifically including:

in one aspect, the present invention provides a multi-view virtual display signal processing method, and the method includes: in a state that at least two view signals of a predetermined frequency are received, synchronously processing the at least two view signals to form a multi-view video signal and a multi-channel audio signal, and outputting the two signals; and forming, according to the multi-view video signal, a first-type control signal matching the multi-view video signal and outputting the first-type control signal.

In yet another aspect, the present invention provides a multi-view virtual display signal processing system, and the system includes:

a synchronous output device configured for outputting at least two view signals;

a signal processing device configured for, in a state that at least two view signals of a predetermined frequency are received, synchronously processing the at least two view signals to form a multi-view video signal and a multi-channel audio signal, and outputting the two signals; and forming, according to the multi-view video signal, a first-type control signal matching the multi-view video signal and outputting the first-type control signal;

a signal transmitting unit configured for outputting the first-type control signal; and a high-frequency display device configured for receiving and displaying the multi-view video signal.

In yet another aspect, an embodiment of the present invention further provides a computer readable storage medium on which a computer program is stored, where when the computer program is executed by a processor, the above multi-view virtual display signal processing method is implemented.

In yet another aspect, an embodiment of the present invention provides an electronic device, and the device includes a memory, a processor, and a computer program stored in the memory and operable on the processor, where when the processor executes the computer program, the above multi-view virtual display signal processing method is implemented.

DETAILED DESCRIPTION OF THE EMBODIMENTS

Figure 1:
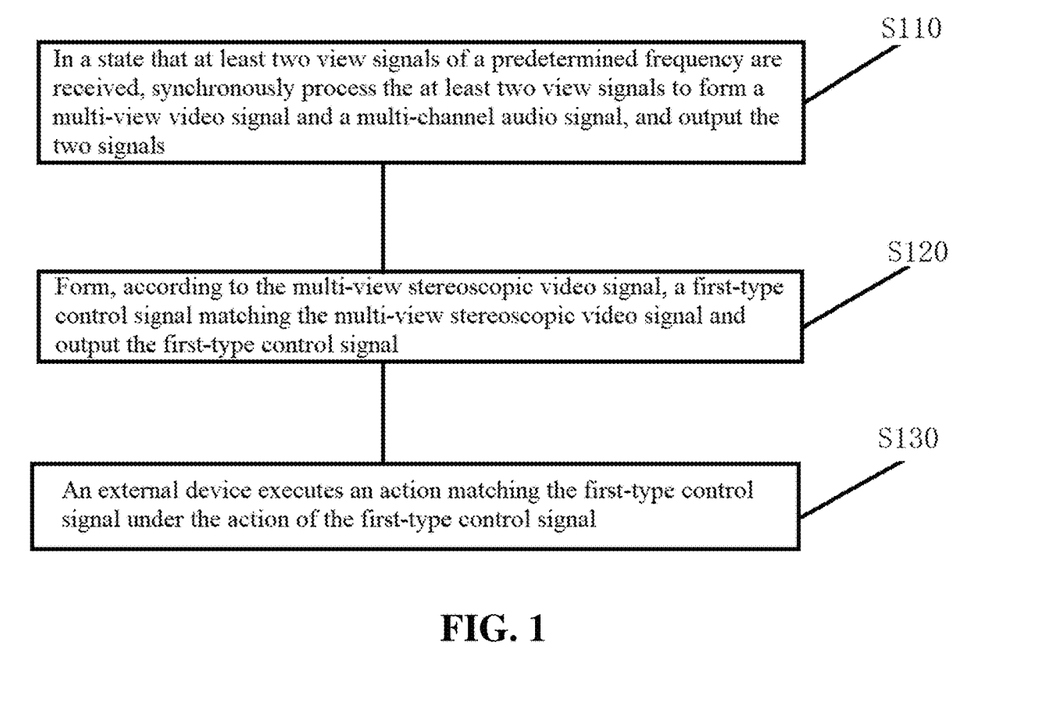
FIG. 1 is a schematic flow diagram of a multi-view virtual display signal processing method provided by the present invention.

In the embodiment, as shown in FIG. 1, the present invention provides a multi-view virtual display signal processing method, and the method includes:

in S110, in a state that at least two view signals of a predetermined frequency are received, synchronously processing the at least two view signals to form a multi-view video signal and a multi-channel audio signal, and outputting the two signals, where the view signals include view audio signals and view video signals, specifically including:

in a state that at least two view signals are received, acquiring view audio signals and view video signals corresponding to the view signals.

A synchronous output device outputs at least two view signals, and can be formed by one or more graphic workstations. When a view signal is relatively large in data size and cannot be processed by one graphic workstation, the view signal can be processed and outputted by a plurality of graphic workstations, and the processed view signal can be received by a signal processing device.

performing buffering of the view video signals, sorting the buffered view video signals to form a multi-view video signal, forming an output frequency according to the view video signals and the predetermined frequency, and outputting the multi-view video signal according to the output frequency; specifically, the signal processing device receives the view signals, and performs synchronous processing of video signals in a plurality of the view signals; and specifically, the signal processing device receives a plurality of view signals, and performs buffering of the plurality of view signals to ensure that a plurality of video signals at the same moment are received, and then the multi-view video signals are processed synchronously.

Figure 2:
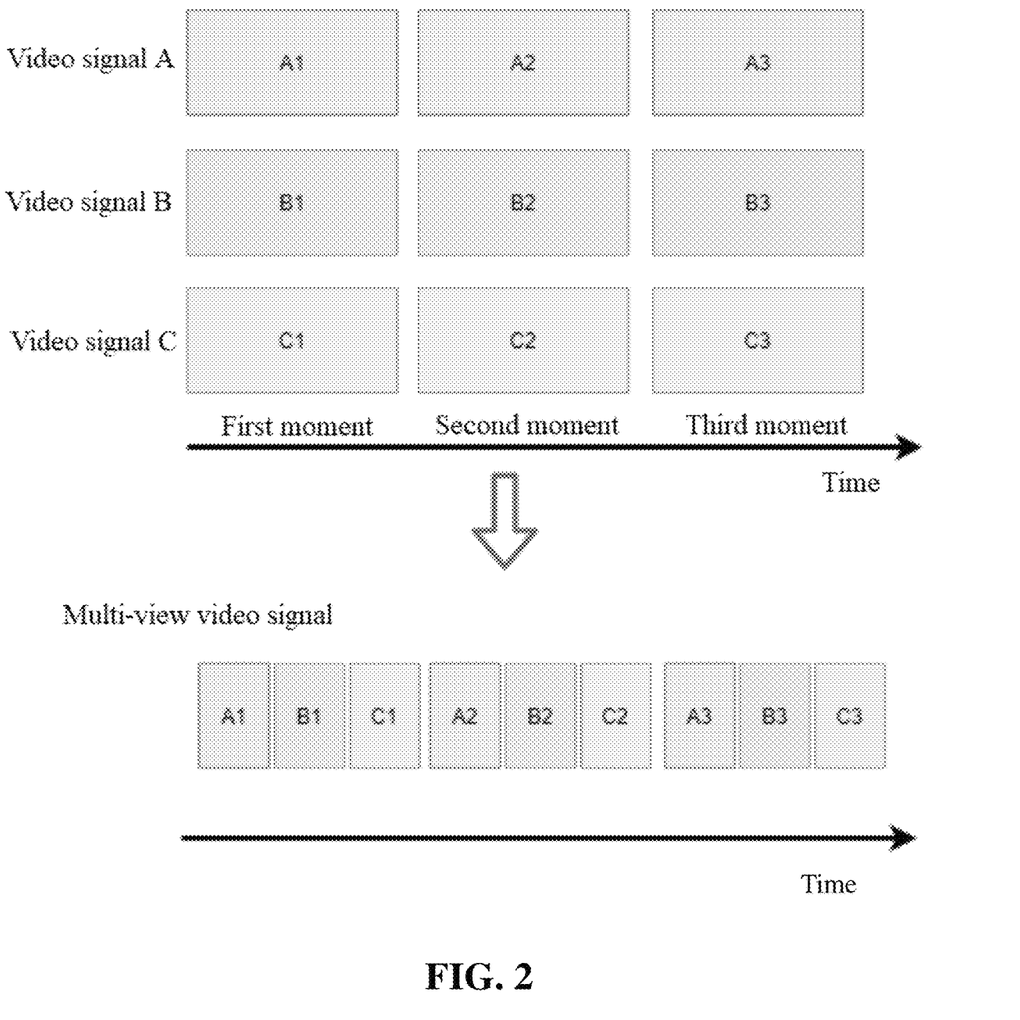
FIG. 2 is a schematic diagram of a multi-view virtual display signal provided by the present invention.

For example, as shown in FIG. 2, currently at least three video signals are inputted, namely a video signal A, a video signal B, and a video signal C; the three video signals are synchronously inputted into the signal processing device, where the video signal A includes the video signals at the last three moments, namely a video signal A1 at the first moment, a video signal A2 at the second moment, and a video signal A3 at the third moment, respectively; similarly, the video signal B includes the video signals at the last three moments, namely a video signal B1 at the first moment, a video signal B2 at the second moment, and a video signal B3 at the third moment, respectively; the video signal C includes the video signals at the last three moments, namely a video signal C1 at the first moment, a video signal C2 at the second moment, and a video signal C3 at the third moment, respectively; the signal processing device receives the video signal at the first moment, the video signal at the second moment, and the video signal at the third moment; after the video signal A1 at the first moment, the video signal B1 at the first moment, and the video signal C1 at the first moment are all received, the video signal A1 at the first moment, the video signal B1 at the first moment, and the video signal C1 at the first moment are buffered; after the buffering is completed, the video signal A1 at the first moment, the video signal B1 at the first moment, and the video signal C1 at the first moment are synchronously mixed so that the video signal A1 at the first moment, the video signal B1 at the first moment, and the video signal C1 at the first moment are outputted according to a predetermined sequence; and for example, the output sequence is as follows: a video signal A1L (a left eye signal of the video signal A1 at the first moment), a video signal B1L, a video signal C1L, a video signal A1R (a right eye signal of the video signal A1 at the first moment), a video signal B1R, and a video signal C1R.

The video signals are outputted according to the predetermined sequence as follows: the video signal A1L, the video signal B1L, the video signal C1L, the video signal A1R, the video signal B1R, and the video signal C1R, which is a multi-view video signal.

The output frequency is formed according to the view video signal and the predetermined frequency; specifically, when the frequency of the view video signal is f1, and when the number of viewing angles is 3, the output frequency is 3*f1.

a multi-channel audio signal matching the multi-view video signal is formed according to the multi-view video signal and the view audio signal.

The signal processing device receives the view signal, and forms a multi-channel audio signal matching the multi-view video signal according to the multi-view video signal and the view audio signal; it may further be understood that the signal processing device, according to the audio signals in the plurality of the view signals, forms a multi-channel audio signal matching the number of viewing angles; specifically, when there are three viewing angles currently, a three-view audio signal is formed, and each view audio signal has an independent frequency; for example, the audio signal corresponding to the video signal A is an A-frequency audio signal, the audio signal corresponding to the video signal B is a B-frequency audio signal, and the audio signal corresponding to the video signal C is a C-frequency audio signal, while the A-frequency audio signal, the B-frequency audio signal, and the C-frequency audio signal form the multi-channel audio signal.

In S120, according to the multi-view stereoscopic video signal, a first-type control signal matching the multi-view stereoscopic video signal is formed and outputted.

Figure 3:
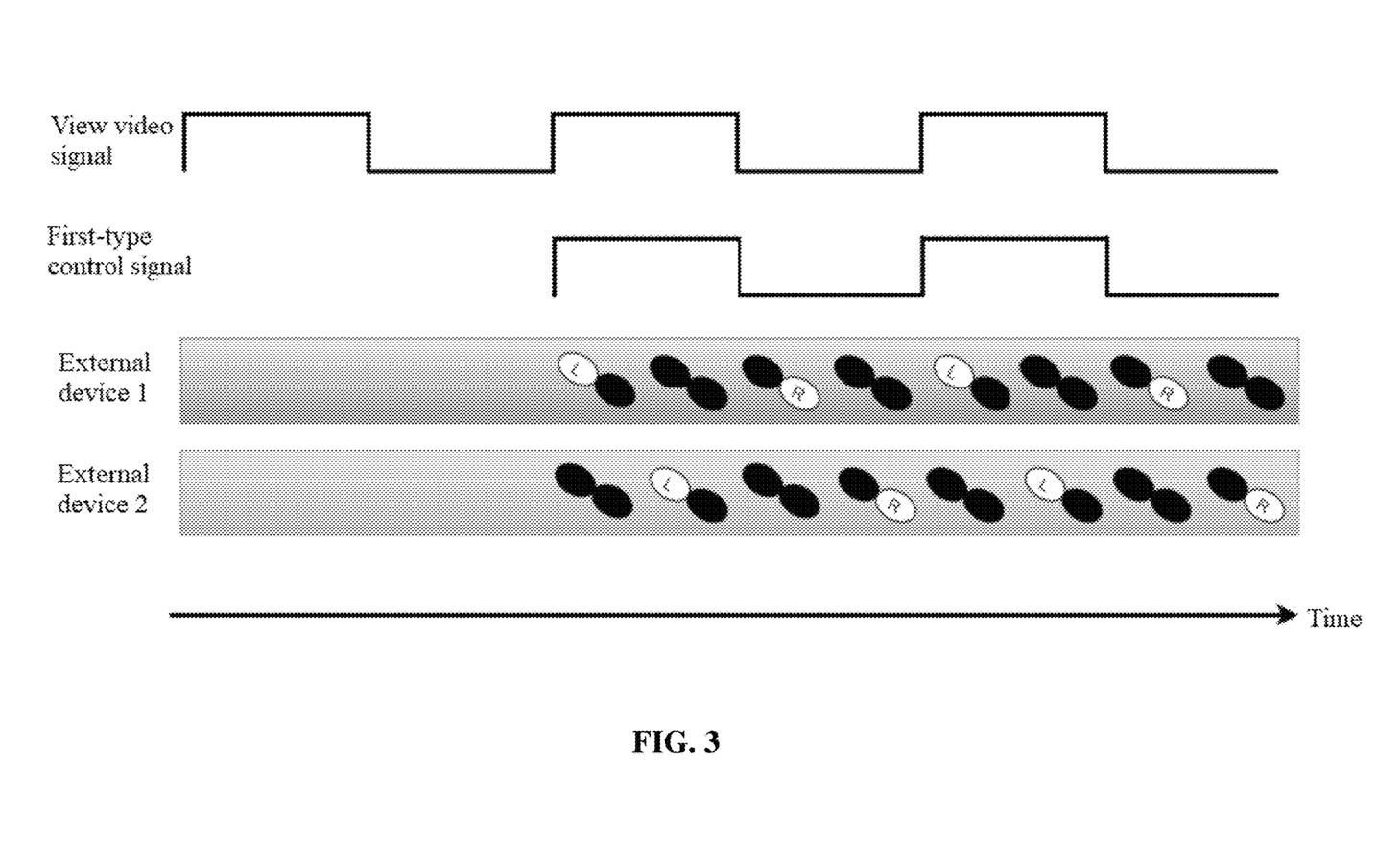
FIG. 3 is a schematic diagram of a multi-view virtual display signal provided by the present invention.

Specifically, the first-type control signal is formed through two ways: one way is to control different external devices by periods through use of the same pulse signal; and the other way is to control different external devices through encoding of a plurality of different pulse signals, specifically including:

When the first-type control signal is the same pulse signal, two-way signals are taken as an example, as shown in FIG. 3; the first-type control signal is delayed by one pulse period than the view video signal, and usually can be delayed by a half pulse period; and it is only necessary to ensure that the signal processing device completes the sorting of multi-view video signals within the delay time. Schematically, the left eye control signal of the external devices is formed in the high level state of the pulse signal, the right eye control signal of the external devices is formed in the low level state of the pulse signal, and the duration of the high level is subjected to time-sharing operation in the high level state of the pulse signal; for example, the first half of the high level is set as a left eye device for controlling a first external device (hollow ellipse indicates "opened", while solid ellipse indicates "closed"), and the second half thereof is set as a left eye device for controlling a second external device; when there are three viewing angles, three external devices are required, the duration of the high level is divided into thirds, and each part thereof controls different external devices. External devices include external audio play devices and video viewing devices. When an external device is in use, one of a plurality of viewing angles can be arbitrarily selected, and the selection methods include but are not limited to: setting through the components of the external device, setting through wired or wireless connection to a computer and any other information device, and rapidly setting through close contact with a carrier in which setting data are saved for data exchange by use of NFC technology, etc.

Figure 4:
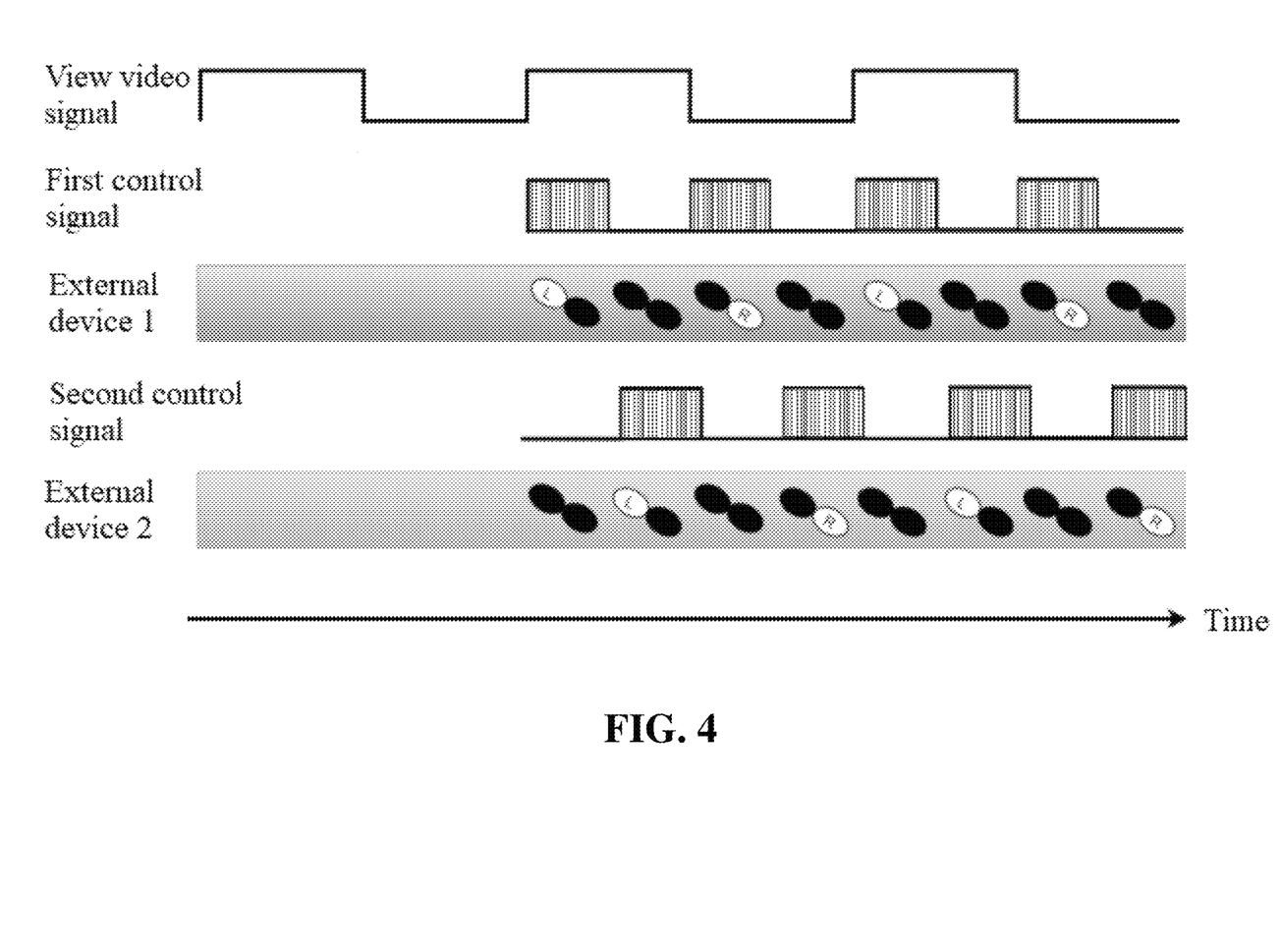
FIG. 4 is a schematic diagram of a multi-view virtual display signal provided by the present invention.

When the first-type control signal consists of a plurality of pulse signals, two-way signals are taken as an example, as shown in FIG. 4, where the first-type control signal includes a first control signal for controlling the first external device and a second control signal for controlling the second external device.

In S130, the external device executes an action matching the first-type control signal under the action of the first-type control signal. Specifically, the external video viewing device switches the working states of the left and right lenses under the action of the first-type control signal, and at the same time, the external audio play device plays the view audio signal matching the current view video signal.

The present invention forms a multi-view audio and video signal with a high frequency by processing the view video signal and the view audio signal, realizes the play of the multi-viewing video signal through a high-frequency display device, and controls the video play device to switch different working states through the first-type control signal so as to realize the play of multi-view video pictures in the same physical display area, so that the audience can see different pictures, and at the same time, and the audio signal matching the number of viewing angles is played through the audio play device, thereby providing different viewers with a better immersive experience.

Figure 5:
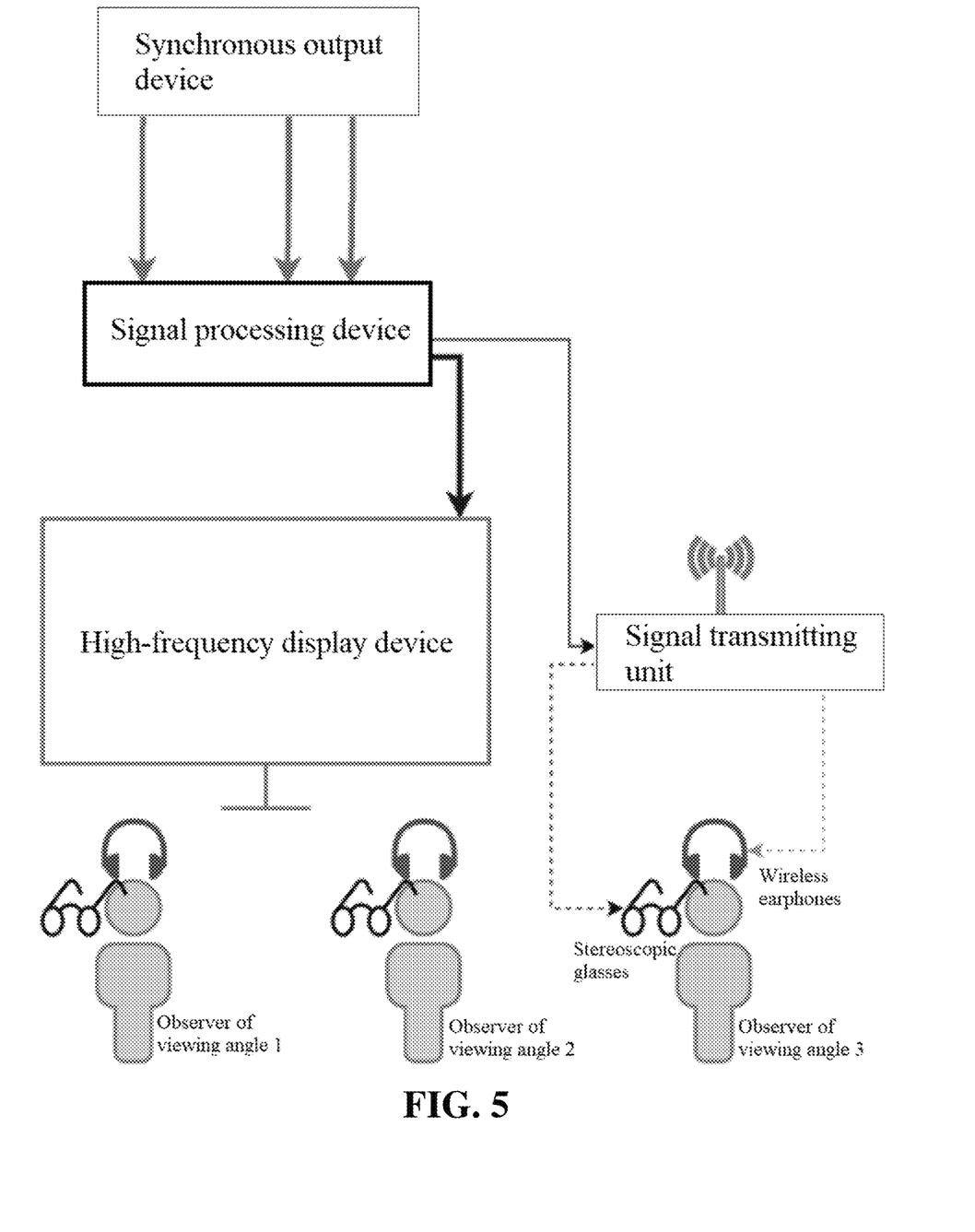
FIG. 5 is a structural schematic diagram of a multi-view virtual display signal processing system provided by the present invention.

In the embodiment, as shown in FIG. 5, the present invention further provides a multi-view virtual display signal processing system, and the system includes:
 a synchronous output device configured for outputting at least two view signals;
 a signal processing device configured for, in a state that at least two view signals of a predetermined frequency are received, synchronously processing the at least two view signals to form a multi-view video signal and a multi-channel audio signal, and outputting the two signals; and forming, according to the multi-view video signal, a first-type control signal matching the multi-view video signal and outputting the first-type control signal; and
 a high-frequency display device configured for receiving and displaying the multi-view video signal. The high-frequency display device can be refreshed quickly at a frequency of above 60 Hz, such as, at least 240 Hz. The high-frequency display device includes but is not limited to: an LCD display, an OLED display, an LED display and a projection device. Since the high-frequency display device displays pictures of different viewing angles in turn, and since superimposed pictures will be found on the display with naked eyes, it is necessary to wear special shutter-type stereoscopic glasses for viewing. Different pictures with parallax must be seen by two eyes respectively to show a three-dimensional effect, so it must be realized that corresponding pictures are only visible to one eye. A signal transmitting unit matched with the video play device (stereoscopic glasses) will wirelessly send out the synchronous signal outputted by the signal processing device, and the stereoscopic glasses switch the visibility of the lens according to the wireless signal; for example, the corresponding lenses of the glasses at the viewing angle A are opened only when group A pictures are displayed, that is, the left-eye lens of the viewing angle A is visible only when the pictures of A1L, A2L, A3L and the like are displayed, and the right-eye lens of the viewing angle A is visible only when the pictures of A1R, A2R, A3R and so on are displayed, so the three-dimensional pictures of way A can be observed from the viewing angle A. The corresponding lenses of the glasses at the viewing angle B are opened only when group B pictures are displayed.

The frame rate of display switching is high enough, and each lens will be opened 60 times per second to view the corresponding pictures; due to the visual persistence effect of human eyes, a viewer cannot feel the rapid switching of lenses, and the final experience is similar to that of wearing ordinary glasses to watch the display.

The signal transmitting unit outputs the first-type control signal; the signal transmitting unit can receive the synchronous signal, and then send it out through the 2.4 G frequency band after being encoded by a special protocol, and the glasses will switch according to the synchronous signal and settings to match the pictures. A wireless signal transmitter can simultaneously receive a plurality of audio signals, compress and encode each audio signal and then send them out through different 2.4 G channels. The earphones worn by the audience can be connected to the glasses, the corresponding audio channels can be automatically selected according to the settings of the glasses, and the received audio data is decoded for playing, so that in the same space, the audience with the glasses at the same viewing angle can hear the same sound, while other audience can hear different sounds from different viewing angles.

In an embodiment of the present invention, the above multi-view virtual display signal processing system further includes:
 an external device used for executing an action matching the first-type control signal under the action of the first-type control signal.

In some embodiments of the present invention, the above multi-view virtual display signal processing system is provided, where the external device includes a video viewing device and an audio play device.

A multi-view virtual display signal processing system is described above, and its working principle is the same as that of the multi-view virtual display signal processing method in Embodiment 1, which will not be repeated here.

In yet another aspect, an embodiment of the present invention further provides a computer readable storage medium on which a computer program is stored, where when the computer program is executed by a processor, the above multi-view virtual display signal processing method is implemented.

In yet another aspect, an embodiment of the present invention provides an electronic device, and the device includes a memory, a processor, and a computer program stored in the memory and operable on the processor, where when the processor executes the computer program, the above multi-view virtual display signal processing method is implemented.

What is claimed is:

1. A multi-view virtual display signal processing method, comprising:
 in a state that at least two view signals of a predetermined frequency are received, synchronously processing the at least two view signals to form a multi-view video signal and a multi-channel audio signal, and outputting the two signals; and
 forming, according to the multi-view video signal, a first-type control signal matching the multi-view video signal and outputting the first-type control signal;
 wherein the first-type control signal is a pulse signal delayed by a delay time within which sorting of the multi-view video signal is completed, and
 in a high level state of the pulse signal, a time-sharing operation is performed to respectively control different external devices that provide the at least two view signals, in different parts of duration of the high level state.

2. The multi-view virtual display signal processing method according to claim 1, further comprising:
executing an action, by an external device, under the action of the first-type control signal.

3. The multi-view virtual display signal processing method according to claim 1, wherein the view signals comprise view audio signals and view video signals; in a state that at least two view signals of a predetermined frequency are received, synchronously processing the at least two view signals to form a multi-view video signal and a multi-channel audio signal, and outputting the two signals, specifically comprising:
in a state that at least two view signals are received, acquiring view audio signals and view video signals corresponding to the view signals;
performing buffering of the view video signals, sorting the buffered view video signals to form a multi-view video signal, forming an output frequency according to the view video signals and the predetermined frequency, and outputting the multi-view video signal according to the output frequency; and
forming a multi-channel audio signal matching the multi-view video signal according to the multi-view video signal and the view audio signal.

4. The multi-view virtual display signal processing method according to claim 2, wherein the external device comprises a video viewing device and an audio play device.

5. A multi-view virtual display signal processing system, comprising:
a synchronous output device configured for outputting at least two view signals;
a signal processing device configured for, in a state that at least two view signals of a predetermined frequency are received, synchronously processing the at least two view signals to form a multi-view video signal and a multi-channel audio signal, and outputting the two signals; and forming, according to the multi-view video signal, a first-type control signal matching the multi-view video signal and outputting the first-type control signal;
a signal transmitting unit configured for outputting the first-type control signal; and
a high-frequency display device configured for receiving and displaying the multi-view video signal;
wherein the first-type control signal is a pulse signal delayed by a delay time within which sorting of the multi-view video signal is completed, and
in a high level state of the pulse signal, a time-sharing operation is performed to respectively control different external devices that provide the at least two view signals, in different parts of duration of the high level state.

6. The multi-view virtual display signal processing system according to claim 5, further comprising:
an external device used for executing an action under the action of the first-type control signal.

7. The multi-view virtual display signal processing system according to claim 6, wherein the external device comprises a video viewing device and an audio play device.

8. A computer-readable storage medium on which a computer program is stored, wherein when the computer program is executed by a processor, a multi-view virtual display signal processing method according to claim 1 is implemented.

9. An electronic device, comprising a memory, a processor, and a computer program stored in the memory and operable on the processor, wherein when the processor executes the computer program, the multi-view virtual display signal processing method according to claim 1 is implemented.

10. A computer-readable storage medium on which a computer program is stored, wherein when the computer program is executed by a processor, a multi-view virtual display signal processing method according to claim 2 is implemented.

11. A computer-readable storage medium on which a computer program is stored, wherein when the computer program is executed by a processor, a multi-view virtual display signal processing method according to claim 3 is implemented.

12. A computer-readable storage medium on which a computer program is stored, wherein when the computer program is executed by a processor, a multi-view virtual display signal processing method according to claim 4 is implemented.

13. An electronic device, comprising a memory, a processor, and a computer program stored in the memory and operable on the processor, wherein when the processor executes the computer program, the multi-view virtual display signal processing method according to claim 2 is implemented.

14. An electronic device, comprising a memory, a processor, and a computer program stored in the memory and operable on the processor, wherein when the processor executes the computer program, the multi-view virtual display signal processing method according to claim 3 is implemented.

15. An electronic device, comprising a memory, a processor, and a computer program stored in the memory and operable on the processor, wherein when the processor executes the computer program, the multi-view virtual display signal processing method according to claim 4 is implemented.

* * * * *